(12) United States Patent
Smith et al.

(10) Patent No.: US 9,476,403 B2
(45) Date of Patent: Oct. 25, 2016

(54) WIND TURBINE BLADE LOWERING APPARATUS

(75) Inventors: Neil Smith, Santa Barbara, CA (US); Josh Kissinger, Ventura, CA (US); Ole Kils, Santa Barbara, CA (US)

(73) Assignee: Barnhart Crane and Rigging Co., Memphis, TN (US)

( * ) Notice: Subject to any disclaimer, the term of this patent is extended or adjusted under 35 U.S.C. 154(b) by 1184 days.

(21) Appl. No.: 13/521,374

(22) PCT Filed: Nov. 30, 2010

(86) PCT No.: PCT/IB2010/003065
§ 371 (c)(1),
(2), (4) Date: Jul. 10, 2012

(87) PCT Pub. No.: WO2011/064659
PCT Pub. Date: Jun. 3, 2011

(65) Prior Publication Data
US 2016/0040649 A1    Feb. 11, 2016

(51) Int. Cl.
| F03D 1/00 | (2006.01) |
| F03D 1/06 | (2006.01) |
| B66C 23/18 | (2006.01) |
| B66C 1/10 | (2006.01) |
| B66C 23/20 | (2006.01) |

(52) U.S. Cl.
CPC .............. F03D 1/001 (2013.01); B66C 1/108 (2013.01); B66C 23/185 (2013.01); B66C 23/207 (2013.01); F03D 1/0658 (2013.01); F05B 2240/916 (2013.01); Y02E 10/721 (2013.01); Y02E 10/726 (2013.01); Y02E 10/728 (2013.01)

(58) Field of Classification Search
CPC ............... F03D 1/001; F03D 1/0658; F05B 2240/916; B66C 1/108; B66C 23/185; B66C 23/207; Y02E 10/721; Y02E 10/726; Y02E 10/728
See application file for complete search history.

(56) References Cited

U.S. PATENT DOCUMENTS

| 2006/0151767 | A1* | 7/2006 | Wobben | ................ | F03D 1/001 254/334 |
| 2006/0228220 | A1* | 10/2006 | Wobben | ................ | F03D 1/001 416/244 R |
| 2010/0005656 | A1* | 1/2010 | Vangsy | ................ | F03D 1/001 29/889.1 |
| 2010/0225120 | A1* | 9/2010 | Krogh | ................ | F03D 1/001 290/55 |
| 2010/0254813 | A1* | 10/2010 | Dawson | ............... | B66C 23/207 416/146 R |
| 2011/0042632 | A1* | 2/2011 | Van Berlo | .............. | B66C 23/18 29/428 |
| 2012/0228881 | A1* | 9/2012 | Siegfriedsen | ......... | F03D 1/001 290/55 |

FOREIGN PATENT DOCUMENTS

WO    WO-03/102409 A1    12/2009

* cited by examiner

*Primary Examiner* — Igor Kershteyn
(74) *Attorney, Agent, or Firm* — Warner J. Delaune; Baker Donelson, et al.

(57) ABSTRACT

The present invention relates to a wind turbine enabling a cost effective and easy attachment/replacement of rotor blades and to a method of attaching a rotor blade to a hub of a wind turbine. The wind turbine in accordance with the invention comprises a tower resting on a base, at least one rotor blade having a blade connector portion, a nacelle housing a shaft to which a hub is attached, the nacelle being mounted atop the tower. Said hub of the wind turbine comprises a plurality of hub connection flanges, each hub connection flange being adapted to be detachably connected to a blade connector portion of a rotor blade.

11 Claims, 8 Drawing Sheets

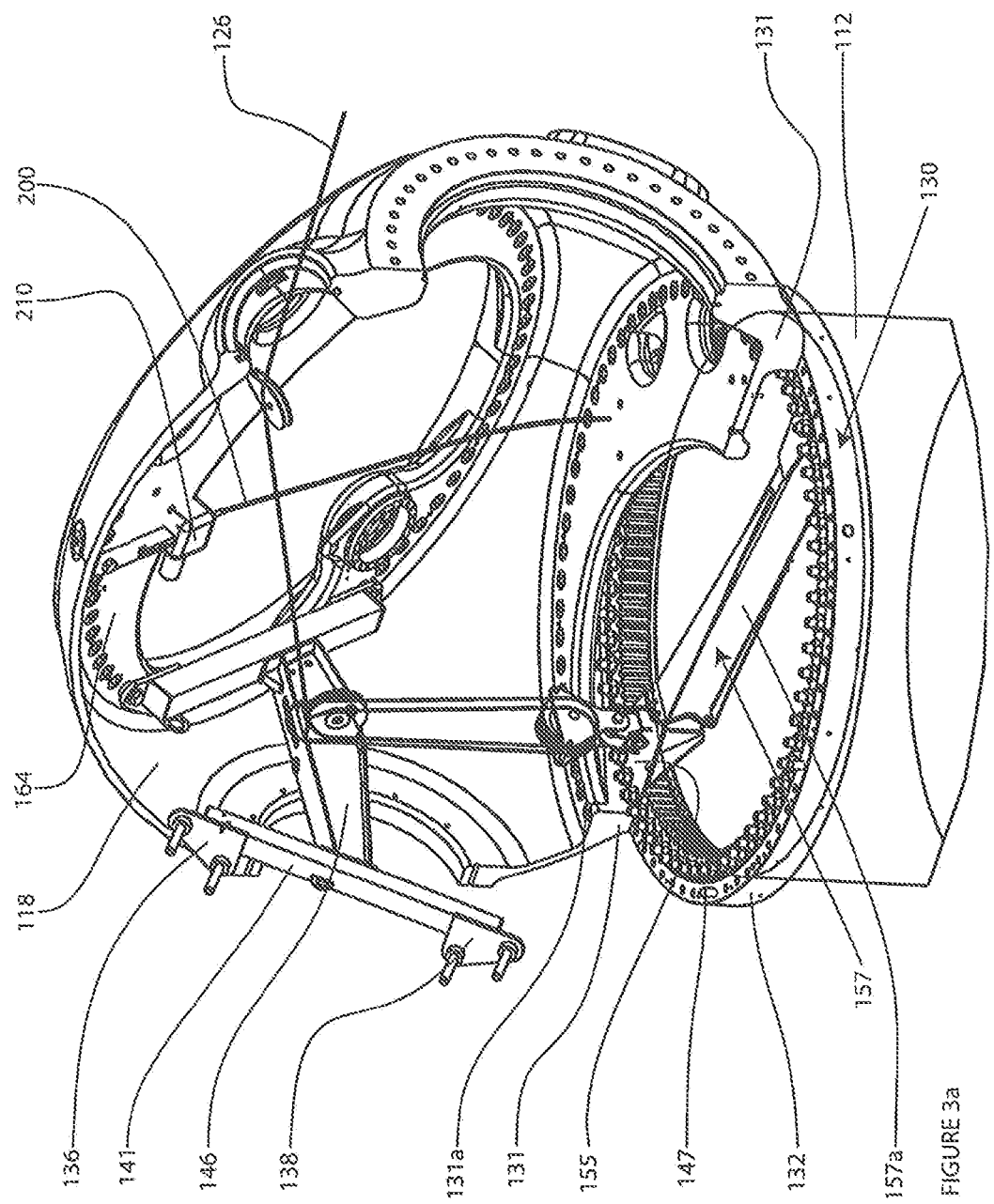

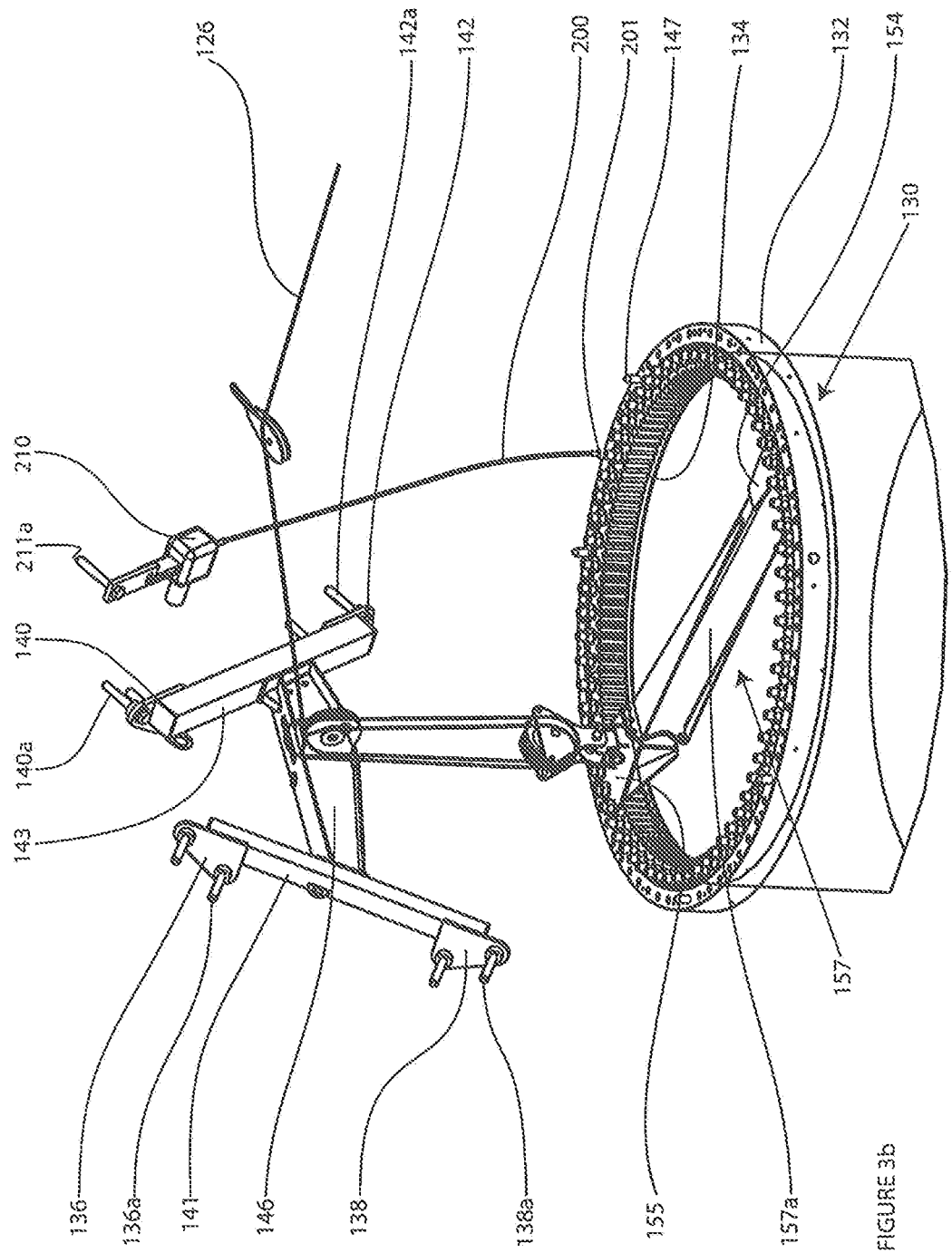

WIND TURBINE BLADE LOWERING APPARATUS

CROSS-REFERENCE TO RELATED APPLICATIONS

This application is a 35 USC §371 U.S. national stage filing of International Patent Application No. PCT/IB2010/003065 filed on Nov. 30, 2010.

BACKGROUND OF THE DISCLOSURE

1. Field of the Invention

This invention relates to wind turbines housed in a nacelle atop a tall tower, and more particularly to an apparatus and method for raising or lowering a rotor blade of a wind power installation for connection to a hub or disconnection from the hub.

2. Description of the Prior Art

The average wind turbine size is now approximately 1.5 MW with rotor diameters ranging from 70 to 85 m. This class of turbines has on average a nacelle weight of 50 tons (generators, gear box and nacelle housing) and a rotor weight of approximately 75 tons. To improve the economics of wind turbines, manufacturers have been designing taller towers to take advantage of greater wind energy at higher levels above ground. Manufacturers are increasingly relying on 80 and 100 m tower designs, rather than the shorter towers used previously. The cost of lowering and lifting rotor blades to the top of tall land based towers for servicing can be prohibitive, mainly due to the reach of conventional cranes, which require much higher crane capacity than the actual weight being lifted. This is due to the bending moment resulting from the reach of conventional cranes. Currently wind turbines require that a crane or special apparatus to be brought to the wind turbine site for accessing the blades through removal of each blade, in order to remove the blades from the rotor hub to which it is attached and lower them down to the ground for repair or replacement. This adds a substantial cost for repair and blade replacement activity leading to an increase in the cost of energy.

Cranes are also used for mounting rotor blades to a wind power installation. A crane raises the rotor blade from the base of the wind power installation and takes it to the rotor blade connection at the hub of the wind power installation. Bolts through a flange of the rotor blade into a mating part of the hub make the connection of the blade to the hub. Nuts are screwed onto the bolts to secure the blade to the hub.

US Patent Application Publication US 2009/0058096 (Wobben) discloses a method of mounting or dismantling a rotor blade of a wind power installation without using a crane. A cable is stretched between a part in the outside surface of the hub of the wind power installation and the bottom region of the wind power installation. The rotor blade is moved along the cable upwardly upon mounting or downwardly upon dismounting the blade.

German Patent DE 20 2004 016460 U1 discloses a block-and-tackle mechanism for raising and lowering sections of a rotor blade. The mechanism is attached to the outside surface of the hub and the outside surface of the rotor blade.

PCT/JP2008/059474 published Dec. 24, 2008 of Tomohiro Umajiri, et al. discloses a method of mounting a rotor blade, which allows the blade to be mounted and removed without using multiple construction machines. The suspension device has a pulley inside the hub, a holding section inside the blade, and a winch. The pulley leads a suspension wire from the rotor hub, on which the blade is to be mounted, to the holding section fixed at the root end and inside the blade. The holding section holds the mounting end side of the blade such that a line connecting the center of gravity of the blade and a connection section to which the suspension wire is connected intersects with the longitudinal axis of the blade. The winch is placed on the ground and raises and lowers the holding section/blade by pulling in and paying out the suspension rope.

The above-described publication has the disadvantage that it does not provide a way of accurately guiding the blade into engagement with the hub connection flange. It also adds weight to each blade by use of the holding section within the blade, which cannot be removed from the blades once they are mounted.

It is desirable to provide an apparatus and method, which facilitates the repair and replacement of wind turbine blades and lowers the costs of such repair and replacement.

SUMMARY OF THE DISCLOSURE

The present invention relates to a wind turbine enabling a cost effective and easy attaching and lowering of a rotor blade.

The wind turbine comprises a tower resting on a base, at least one rotor blade having a blade connector portion, and a nacelle housing a shaft to which a hub is attached, the nacelle being mounted atop the tower. The hub comprises a plurality of hub connection flanges, and each of the hub connection flanges is adapted to be detachably connected to a blade connector portion of a rotor blade.

A blade pulley system including at least one pulley is detachably connected to the blade connector portion of a rotor blade which shall be attached to the hub or lowered from the hub.

The wind turbine further includes a truss system, said truss system comprises a pulley beam including at least one pulley and two mounting beams, wherein each mounting beam is detachably connected to a respective hub connection flange, thereby positioning the pulley beam above a further hub connection flange.

In case the hub comprises three hub connection flanges, the blade to be attached (or removed) is assigned to one hub connection flange and the truss system is detachably connected to the remaining two hub connection flanges.

The blade pulley system and the truss system are connected to the blade and the hub, respectively, only if a blade should be mounted or lowered, and therefore no additional weight is added to the turbine in its operating condition. To mount the truss system and the pulley system, neither additional components nor additional openings in the hub are required—the blade pulley system is detachably connected to the blade connector portion of the blade and the truss system is detachably attached to those hub connection flanges where no blade shall be attached or removed.

Due to the geometry of the hub, the hub connection flanges have a specific orientation to each other, and by using the hub connection flanges to attach the truss system said system has a specific orientation in the hub. To modify the position of the truss system within the nacelle, in particular to modify the position of the pulley within the nacelle, the truss system can be displaced clockwise or anti-clockwise related to the hub connection flanges. Due to the shape of the hub connection flanges (circular) a displacement of the truss system results in a translation/movement along two spatial axes within the nacelle.

The wind turbine in accordance with the present invention facilitates the repair and replacement of wind turbine blades and lowers the costs of such repair and replacement due to the design and the attachment method of the truss system and the blade pulley system. Both systems use components available anyway within the hub and at the blade, i.e. no additional components must be arranged within the hub or at the blade to attach the systems. Furthermore, it is not necessary to provide for any additional opening within the hub and therefore the attachment of the systems does not cause an additional structural weakening of the hub structure.

The blade connector portion of the blade may be provided by the root end of the blade. In such a case the root end comprises a plurality of fastening openings and can be attached to the hub connection flange via these fastening openings. However, it is preferred that the blade connector portion of a rotor blade is provided by a pitch bearing thereby enabling the pitching of the blade. The pitch bearing comprises an outer race and an inner race, the outer race being adapted to be connected to a hub connection flange and the inner race being adapted to be connected to the root end of the rotor blade. If the blade connector portion is provided by a pitch bearing, it is preferred that the blade pulley system is detachably connected to the inner race of the pitch bearing.

To facilitate the alignment of the hub connection flange and the outer race of the pitch bearing, a plurality of tapered alignment pins may be attached to the outer race of the pitch bearing. When the blade is raised, the outer race approaches the hub connection flange and once the tapered alignment pins engage their female counterparts a precise alignment of the outer race and the hub connection flange occurs enabling the attachment of hub connection flange to the outer race.

To avoid any damage to the hub connection flange or the pitch bearing it is very important that they are aligned very precisely before they come in contact with each other, and, in case there is any misalignment between the hub connection flange and the pitch bearing, to remedy such misalignment. It is therefore preferred that the wind turbine comprises, at least as soon as the blade approaches the hub, a plurality of flexible cables, wherein each cable is connected to the outer race of the pitch bearing and to a hoist. The hoists may be arranged anywhere in the hub or the nacelle, however, it is preferred that the hoists are bolted to hub connections flanges.

The present invention also relates to a method for attaching a rotor blade including a blade connector portion to a hub of a wind turbine, said hub having a plurality of hub connection flanges. The method comprises the steps of: a) positioning one hub connection flange in the 6 o'clock position, b) attaching a truss system comprising a pulley beam with at least one pulley and two mounting beams within the hub by operably connecting each mounting beam to a respective hub connection flange not being in the 6 o'clock position, c) attaching a blade pulley system including at least one pulley to the blade connector portion of a blade, d) providing a hoisting device, e) providing, via the truss system, a cable connection between the hoisting device and the blade pulley system, f) raising said blade, g) attaching the blade connector portion of said blade to the hub connection flange and h) removing the blade pulley system and the truss system.

Due to the weight of modern rotor blades it is very difficult to align them once they are near the hub. Therefore, it is important to raise the blade such that the hub connection flange and the blade connector portion are aligned as well as possible when the blade connector portion approaches the hub connection flange. In a preferred embodiment the method therefore comprises the further steps of:

determining the load path of said blade and, in step b), attaching the truss system so that the at least one pulley is in a predetermined position in respect of the load path, and arranging the pulley of the blade pulley system in accordance with the load path. Due to the attachment method and the geometry of the truss system it is very easy to arrange the at least one pulley at the desired position.

To remedy any remaining misalignment between the hub connection flange and the blade connector portion of the rotor blade to be attached to the hub, a preferred embodiment of the method comprises the additional steps of attaching a plurality of flexible cables, each being connected to a hoist, with the blade connector portion of the blade when the blade connector portion approaches the hub connection flange, and, before attaching the blade connector portion to the hub connection flange, adjusting any misalignment between the hub connection flange and the blade connector portion by using said hoists.

The present invention also relates to a kit of parts for lowering and attaching rotor blades from and to a hub of a wind turbine. Such kit comprises a blade pulley system including at least one pulley and being adapted to be operably connected to a blade connector portion of a rotor blade to be lowered or mounted, and a truss system, said truss system comprising a pulley beam including at least one pulley and two mounting beams, each mounting beam being adapted to be connected to a hub connection flange of the wind turbine hub. The kit may also comprise a plurality of flexible cable/hoist assemblies, the flexible cables being adapted to be connected to the blade connector portion of a blade and the hoists being adapted to be connected to hub connection flanges.

BRIEF DESCRIPTION OF THE DRAWINGS

The invention will be described in detail with reference to the drawings in which:

FIGS. 3a and 3b are perspective drawings of the hub of the wind turbine shown in FIG. 2;

DETAILED DESCRIPTION OF THE DISCLOSURE

Figure 1A:
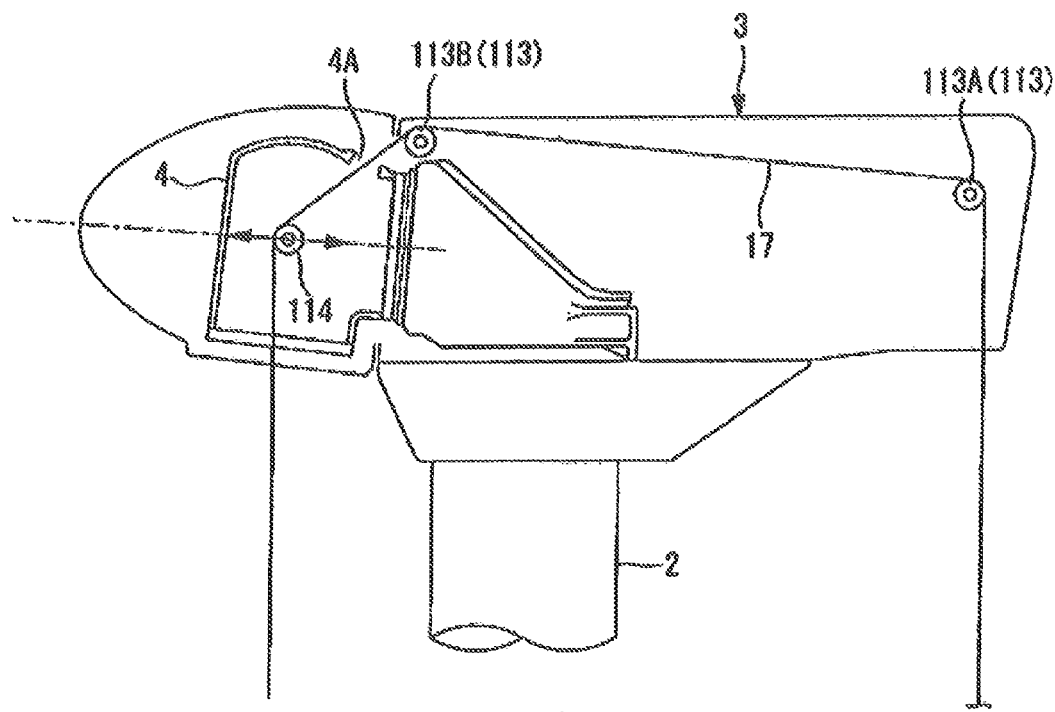
FIGS. 1a and 1b are side elevation views of part of a wind turbine of the prior art.
Figure 1B:
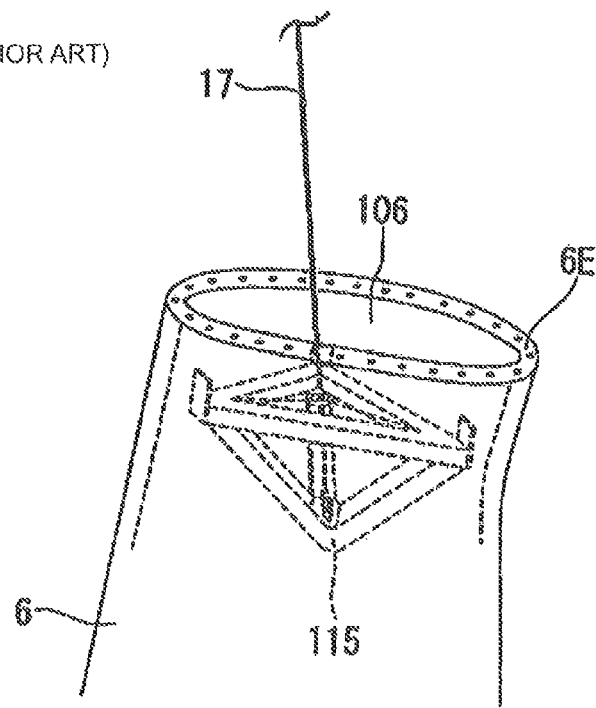

Refer to FIGS. 1a and 1b, which are side elevation views of part of a wind power installation of the prior art Pub. No.: WO/2008/155976 International Application No.: PCT/JP2008/059474 published Dec. 24, 2008 of Tomohiro Umajiri, et al. "Suspension Device For Wind Wheel Blade, Method Of Mounting Wind Wheel Blade, And Method Of Constructing Wind-Driven Generator". This publication discloses a suspension device for a wind turbine rotor blade including a method of mounting the blade, which allows the blade to be mounted and removed without using multiple construction machines.

The suspension device has a pulley (114), a holding section (115), and a winch. The pulley (114) leads a suspension wire (17) from the rotor head (4), on which the blade (6) is to be mounted, to the holding section (115) fixed inside the blade (6) at the root end or mounting end of the blade. The wire (17) is placed so as to be movable in the direction of the axis of rotation of the rotor head (4). The holding section (115) holds the mounting end of the blade (6) such that a line connecting the center of gravity of the blade (6) and a connection section to which the suspension wire (17) is connected intersects with the longitudinal axis of the blade (6). The winch (not shown) is placed on the ground and raises and lowers the holding section (115) by pulling in and paying out the suspension wire (17).

The above-described publication has the disadvantage that it does not provide a way of accurately guiding the blade into engagement with the hub connection flange. It also adds weight to each blade by use of the holding section (115), which cannot be removed or easily removed from the blades once they are mounted. Furthermore, it adds weight to the hub by use of the suspension device, which also cannot be removed.

Figure 2:
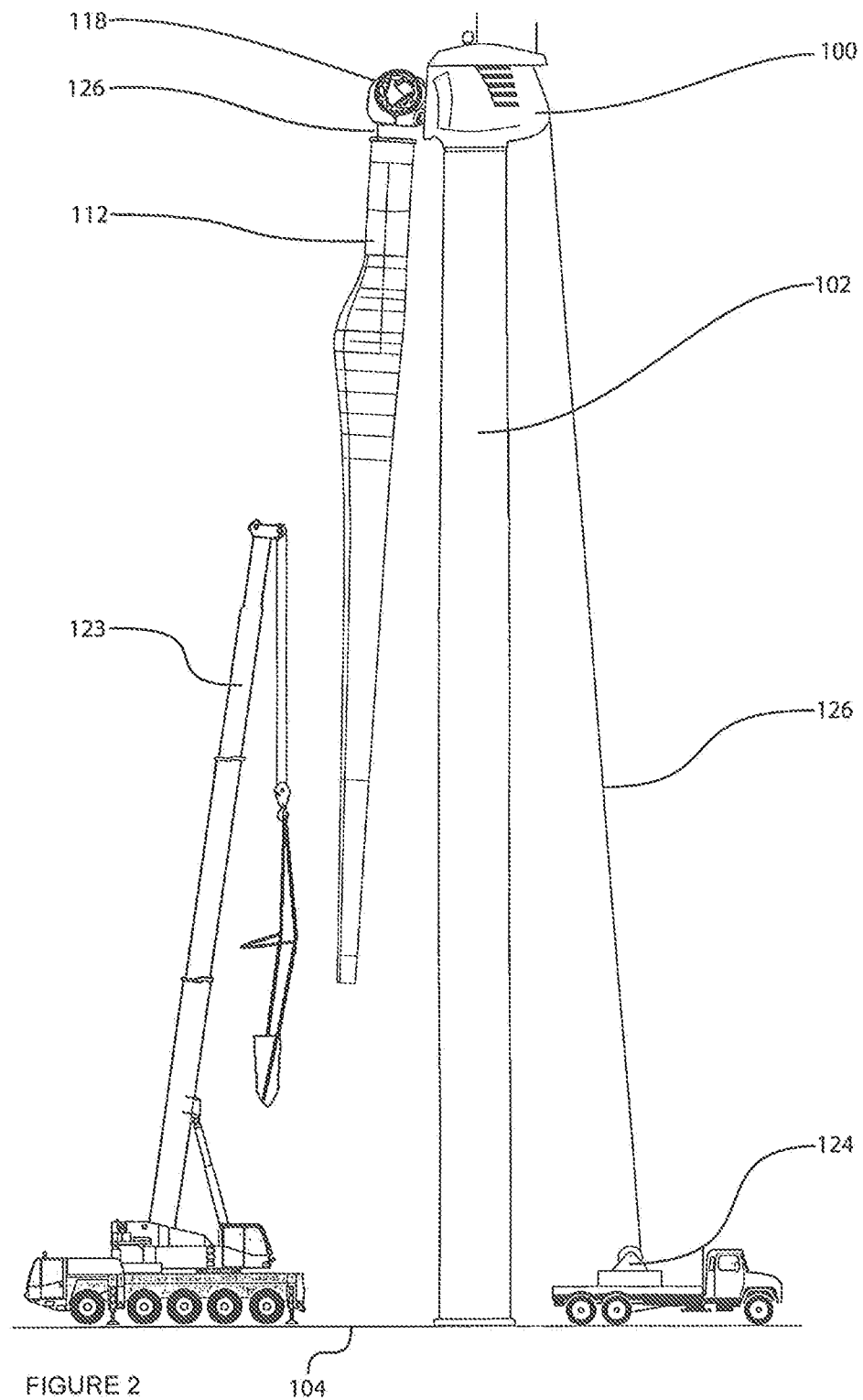
FIG. 2 is a side elevation view of part of a wind turbine in which the invention is embodied.

Refer to FIG. 2, which is a side elevation view of part of a wind turbine in which a preferred embodiment of the present invention is shown. This invention relates to a wind turbine enabling a cost effective and easy attaching and lowering of a rotor blade, to a method for attaching a rotor blade and to kit of part for lowering and mounting rotor blades from and to a hub of wind turbine. Hereafter, the wind turbine is described, wherein, due to the nature of the method only one situation of assembly is described.

Wind Turbine

The wind turbine in accordance with a first embodiment of the present invention includes one or more electric generators housed in a nacelle 100, which is mounted atop a tall tower structure 102 anchored to the ground 104. The nacelle 100 rests on a yaw platform 101 and during operation is free to rotate in the horizontal plane about a yaw pivot so that it is maintained in the path of the wind.

The wind turbine has a rotor with three blades of which only one blade 112 is shown (the wind turbine is not fully assembled). The blades of the shown embodiment are pitchable and variable in length.

When fully assembled, the blades rotate around a horizontal axis in response to wind current. During operation, the nacelle 100 is held on the tower structure 102 in the path of the wind current such that the nacelle is held in place horizontally in approximate alignment with the wind current. At least one electric generator is driven by the rotor to produce electricity and is connected to power carrying cables inter-connecting to other units and/or to a power grid.

Refer to FIGS. 3a and 3b which show a (partial) perspective view of the inside of the hub 118 of the first embodiment. The nacelle itself is not shown to not obscure important components within the nacelle.

In the situation of assembly shown the FIGS. 2-6, only one blade 112 is connected (or in the progress of being connected to or removed from) the hub 118, and therefore the following description is limited to blade 112 and all corresponding components. A person skilled in the art will understand that the following description can be transferred to the two remaining blades.

The hub 118 comprises three hub connection flanges, wherein only two of them, namely flanges 131 and 164 are shown in FIG. 3a. The hub connection flange 131 is operably connected to the blade 112 via the blade connector portion of the blade 112.

In the shown embodiment, the blade connector portion is provided as or by a pitch bearing 130, the pitch bearing 130 being interposed between the hub connection flange 131 and the root end 113 of the blade 112. In other embodiments the blade connector portion may be provided by the root end 113 of the blade 112 itself, i.e. the root end 113 of the blade is directly (but operably) connected to a corresponding hub connection flange (e.g. by bolting the blade connector portion/the root end to the hub connection flange).

The pitch bearing 130 comprises an inner race 134 and an outer race 132, the inner race 134 being connected to the root end 113 of the blade 112 and the outer race 134 being connected to the blade connection flange 131 of the hub 118, thereby operably connecting the blade connector portion (the pitch bearing in this embodiment) to the hub connection flange 131 (and the blade 112 to the hub 118). The inner race 134 comprises an internal gear which is driven by a pitch motor 121 (FIG. 5) rotating the inner race 134 with the blade 112 attached to it to the desired pitch angle.

The inner and outer races 134, 132 of the pitch bearing 130, the root end 113 of blade 112 and the hub connection flange 131 are annularly-shaped and comprise a plurality of circumferentially spaced apart fastener openings, wherein the fastener openings 131a of the hub connection flange 131 and the inner race 134 extend axially therethrough to detachably connect the pitch bearing 130 to the hub connection flange 131 and the root end 113 of the blade 112.

The blade 112 (and the corresponding hub connection flange 131) is arranged in an approximate 6 o'clock position (span wise vertical direction). Since the shown embodiment uses a three-blade hub 118, the other two hub connection flanges are arranged in approximate 10 and 2 o'clock positions.

Modular Truss System

Figure 4:
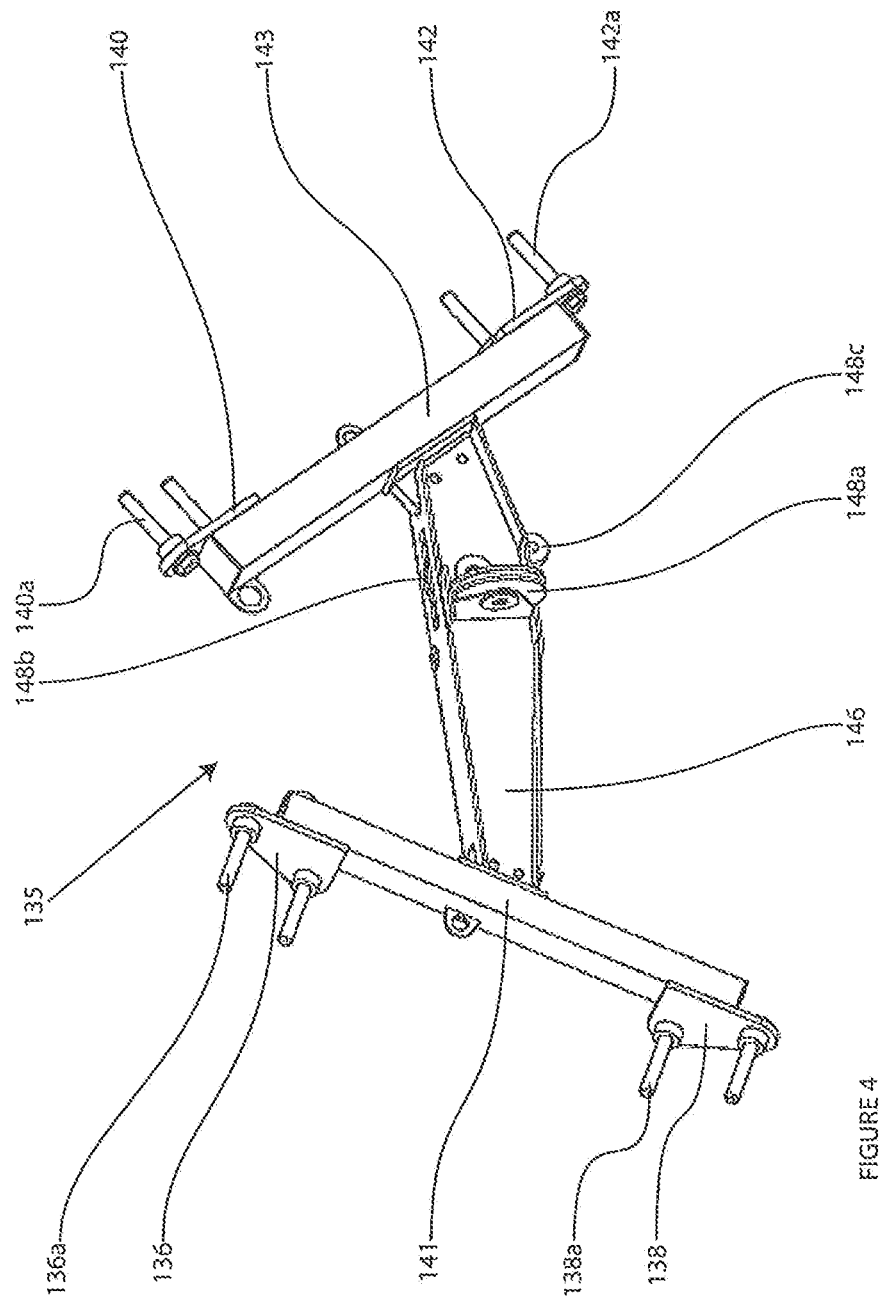
FIG. 4 is a perspective drawing of a rigid modular truss connection system for attachment within the hub shown in FIGS. 3a and 3b.
Figure 5:
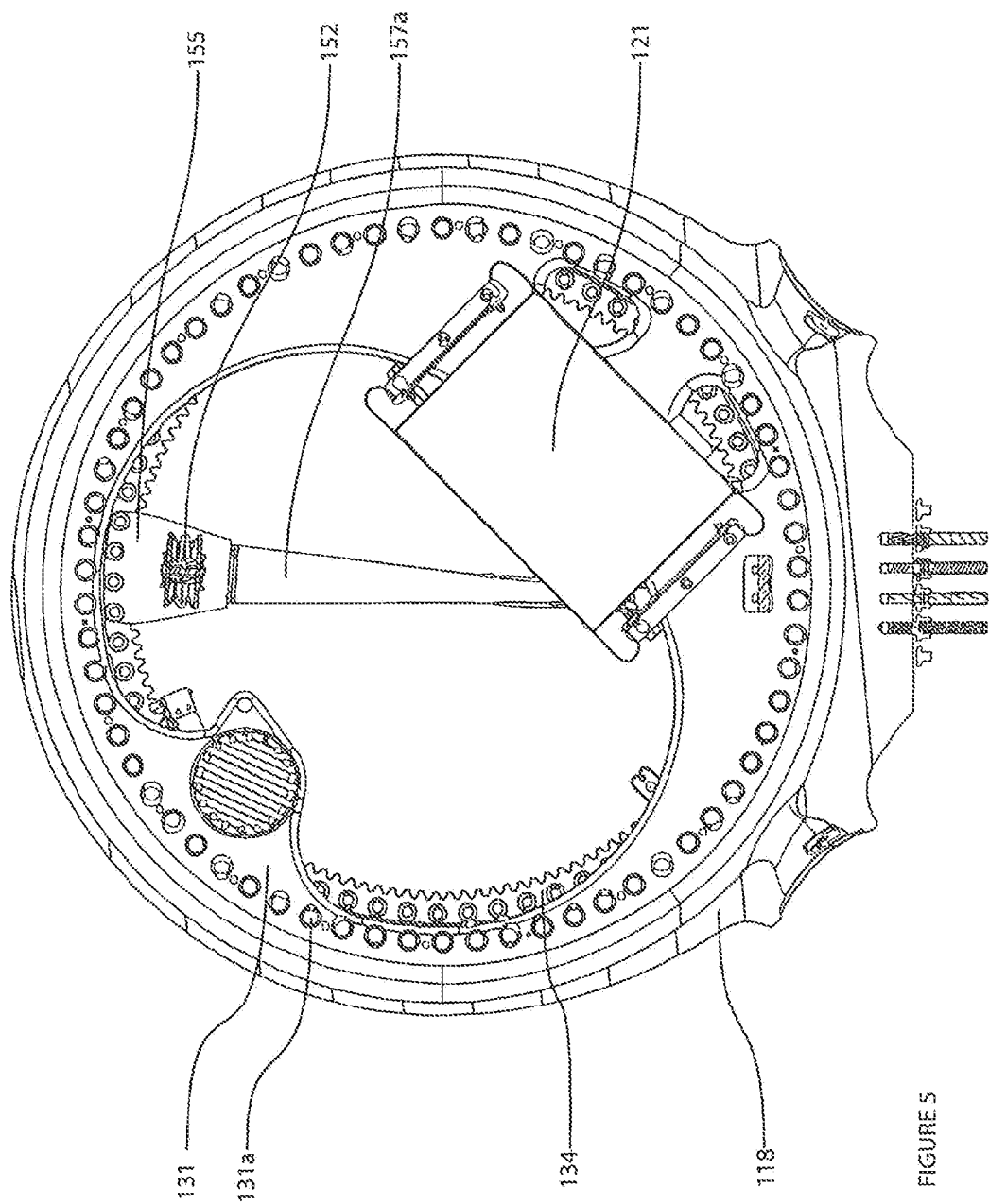
FIG. 5 is a top plan view of a pitch-bearing.
Figure 6:
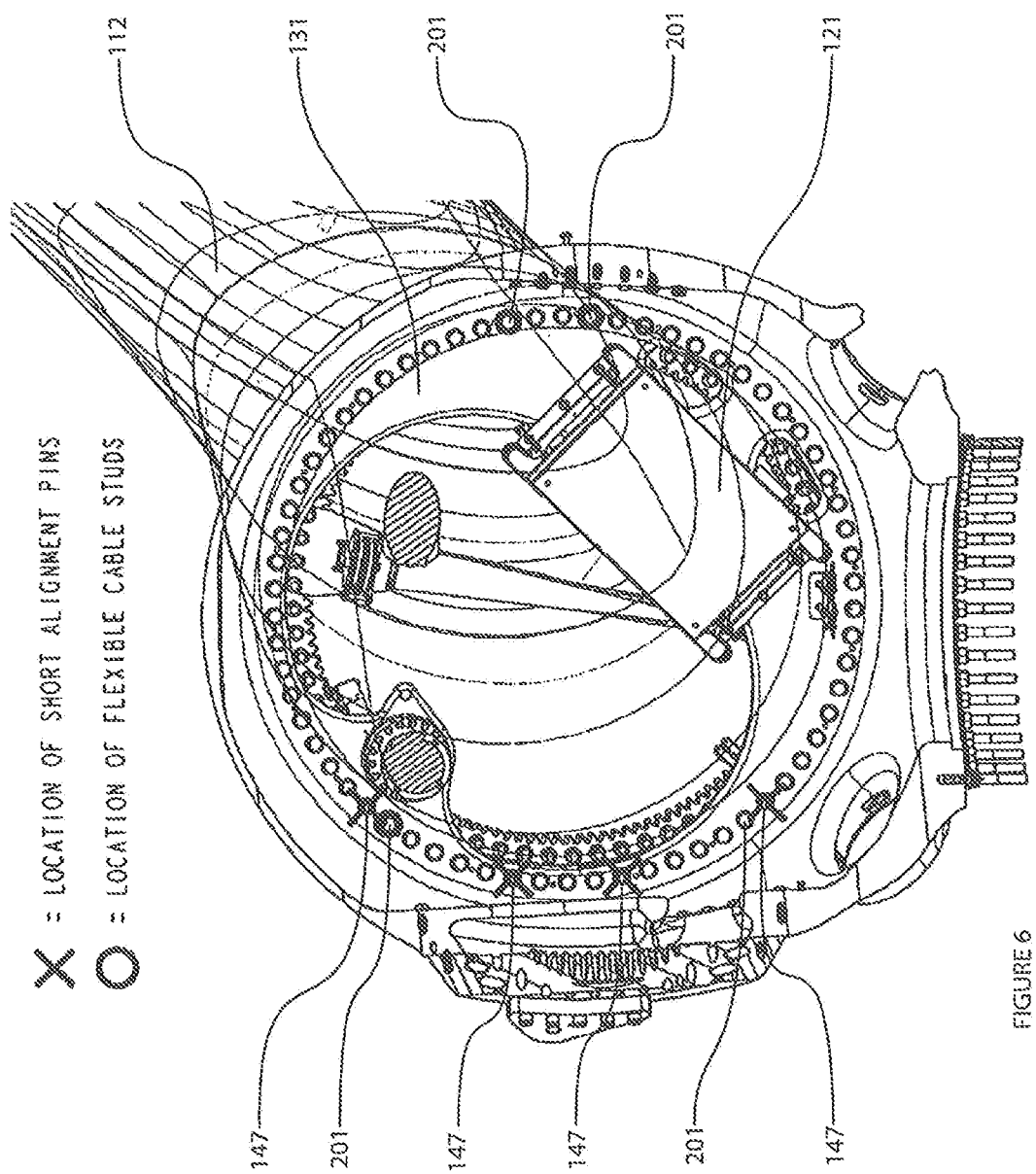
FIG. 6 is a top view the hub and blade shown in FIGS. 3a and 3b with a blade attached illustrating the location of short alignment pins and the location of flexible cable studs.

A rigid modular truss system 135 is detachably mounted within the hub 118. The truss system 135 mounted within the hub is shown in FIGS. 3a and 3b. A detailed view of the truss system is shown in FIG. 4.

The rigid truss system 135 in accordance with the shown embodiment comprises a support beam (or upper pulley beam) 146, two mounting beams 141, 143, and four anchor plates 136, 138, 140, 142, which are used to attach the mounting beams 141, 143 to the hub connection flanges in the 2 and 10 o'clock position. In other embodiments, the mounting beams 141, 143 may be mounted to the above-mentioned hub connection flanges directly without using any anchor plates.

Due to the geometry of the hub 118 and the attachment method of the truss system, the truss system itself is some kind of H-shaped, i.e. its front view is similar to the cross section of a the character "H", wherein the support or upper pulley beam 146 is the horizontal beam (the web) and the mounting beams are the vertical beams.

The truss system 135 is attached by bolting the anchor plates, via corresponding anchor plate bolts 136a, 138a, 140a, 142a (refer to FIG. 3b) to the fastening openings of the hub connection flanges in the 10 and 2 o'clock positions, so that each mounting beam 141, 143 is attached by the anchor plates to one of the hub connection flanges. As mentioned above, the attachment method in accordance with the present invention uses components which are available anyway (the fastening openings of the hub connection flanges) to attach the truss system.

In case the blade to be attached to the hub is not the first one, one (or both) of the hub connection flanges in the 2 and 10 o'clock positions are already connected to a blade. In this case, the bolts connecting the blade(s) to the hub are temporarily removed and the truss system is attached (and the removed bolts are inserted again).

Due to the geometry of a three-blade hub and the modular truss system (and its attachment method and location), said mounting beams 141, 143 are inclined. The support beam 146 is detachably mounted between and to the mounting beams so that the exact location of the support beam depends on the geometry of the nacelle.

In the shown embodiment the mounting beams 141, 143 and the support beam 146 are straight beams, and the support beam is attached between and to the mounting beams so that the truss system 135 as such defines a plane. However, such configuration of the truss system is not essential for the invention. Both the support beams and the mounting beams might be angled.

The support or pulley beam 146 in accordance with the shown embodiment comprises two pulleys 148a, 148b mounted to and integrated into the support or upper pulley beam 146.

To modify the position of the truss system within the nacelle, in particular to modify the position of the pulleys within the nacelle, the modular truss system 135 can be displaced clockwise or anti-clockwise related to the hub connection flanges. Due to the shape of the hub connection flanges (circular) a displacement of the truss system 135 results in a translation/movement along two spatial axes within the nacelle.

If, for example, the truss system 135 is displaced clockwise (assuming a line of sight mounting beam 141, mounting beam 142) it moves upwards within the nacelle. Due to the geometry of the nacelle and the truss system, the upper beam or support beam 146, and thus the pulleys, moves towards the vertical central axis of the nacelle.

The truss system 135 is easy to install within the nacelle as for the installation of the truss system fastener openings of the hub connection flange, otherwise used to connect the hub connection flange to the blade connector portion are used to bolt the mounting beams to the hub connection flanges.

To stabilize the truss system 135, and in particular the upper beam 146 of the truss system, the upper beam 146 may be restrained in the fore and/or aft direction with the use of turnbuckle(s) attached to the hub 118.

To facilitate the mounting or demounting of the blade 112, one of the pulleys 148a, 148b attached to and integrated within the support or upper pulley beam 146 is centered in the load path vertically through the hub 118 (further details below).

Blade Pulley System

As can be seen from FIGS. 3a and 3b, the blade 112 comprises a blade pulley system 157 detachably connected to the blade connector portion, i.e. the pitch bearing 130 in the shown embodiment.

The blade pulley system comprises a pulley beam 157a, a pulley block 152 including two pulleys and two end plates 154, 155 by which the blade pulley system is detachable mounted within or at the blade connector portion of the blade 112.

In the shown embodiment, the blade pulley system is attached via the two end plates 154, 155 to the inner race 134 of the pitch bearing 130 acting as the blade connector portion. The end plates 154, 155 are bolted to a plurality of the fastener openings within the inner race 134 of the pitch bearing, i.e. the end plates are attached via fastener openings which are already present and no additional means for attaching the end plates are necessary. Once the blade 112 is secured to the hub 118, the corresponding bolts can be temporarily released to remove the pulley blade system 157.

Hoisting Device

To lower or raise/lift a rotor blade, the wind turbine must, at least temporarily, comprise some kind of a hoisting device. Such hoisting device may be arranged on the ground, for example on a truck, or may be an integral part of the wind turbine, arranged e.g. in the nacelle or the tower. In the shown embodiment, the hoisting device (in form of a winch 124) is located on a truck, outside the turbine.

The winch is a mechanical device that is used to wind up or wind out the cable to pull the cable in to raise the blade or let the cable out to lower the blade. Any mechanical device that performs this function is within the scope of this invention.

Cable Connection

To lower and raise a blade a cable has to be guided from the blade to the hoisting device. The most simple way to achieve such cable connection is to connect the cable to the blade pulley system 157 (without using the pulley), to guide it over a pulley of the truss system 135, and from the truss system (via a number of pulleys) to the hoisting device. Due to the significant weight of modern rotor blades such simple cable connection is not preferred. Instead of this, a pulley system is used. In the shown embodiment, a cable 126 is fixed to an opening 148c located at the pulley beam 146 of the truss system 135 (see FIG. 4). From this starting point, the cable is guided over one of the pulleys of the pulley block 152 of the blade pulley system 157, over pulley 148b integrated in the pulley beam 146 of the truss system 135, over the other pulley of the pulley block 152, and over pulley 148a attached to the pulley beam 146. Pulley 148a is turned by 90 degrees with regard to pulley 148b to facilitate leading the cable 126 out of the hub. The cable leaves the hub via an opening and is guided to the hoisting device via some further pulleys.

Flexible Cables/Alignment Pins

The pitch bearing 130 outer race 132 comprises a number of alignment pins 147 which may be arranged in some of the fastening openings. The alignment pins help to facilitate the alignment of the blade connector portion (the pitch bearing 130 in the shown embodiment) with the hub connection flange, in particular when a blade it mounted to the hub. As a blade is hoisted the outer race 132 of pitch bearing 130 approaches the hub connection flange 131 and the alignment pins 147 engage their female counterparts. By aligning the outer race 132 of the pitch bearing with the hub connection flange 131 the fastening openings of the flange and the race are also aligned, enabling bolting the outer race 132 to the hub connection flange 131 thereby attaching the blade 112 to the hub 118.

The outer race 132 of the pitch bearing 130 and the hub connection flange 131, respectively, form a (imaginary) plane and it is preferred that the planes are as parallel as possible when the outer race 132 approaches the hub connection flange 131.

To support the parallelism of both planes (i.e. the outer race plane and the hub connection plane) during approach, at least two flexible cables are provided. In the shown embodiment only one cable 200 can be seen and the following description is limited to cable 200.

The flexible cable 200 ends in a connection bolt 201 which is threaded in the outer race 132 of the pitch bearing 130, e.g. in one of the fastening openings within the outer race 132. The other end of the flexible cable 200 is connected with a hoist 210 being mounted to the hub connection flange 164 in the 2:00 position. To mount the hoist 210 to the hub connection flange it is bolted via at least one fastening opening to the hub connection flange.

As the blade is hoisted by the cable 126 the outer race 132 approaches the hub connection flange 131 of the hub and any misalignment (variation from parallelism) between the hub connection flange 131 and the outer race 132 is adjusted by using the hoists to wind in one or more of the flexible cables.

The number and arrangement of the cable/hoist assemblies depends on the blade to be lowered/mounted. Typically, four such assemblies are being used, the connection bolts 201 of the cables 200 being threaded in fastening openings of the outer race 132. For optimal adjustment of the any misalignment it is preferred that the connection bolts are spaced apart from where the blade pulley system is connected to the outer race, whereas the exact arrangement depends on the blade structure.

Method for Attaching a Rotor Blade

Hereafter, the method for attaching a rotor blade to the hub of a wind turbine in accordance with the invention is described, wherein the detailed description is limited to one rotor blade. In case a number of rotor blades should be attached, the method as such remains very similar, and only the attachment of the truss system has to be modified.

First of all, one hub connection flange 131 is positioned in a 6 o'clock position to facilitate the attachment of a truss system. As soon as the hub is in the right position, the truss system 135 comprising a pulley beam 146 with at least one pulley 148a, 148b and two mounting beams 141, 143 is attached within the hub by operably connecting each mounting beam to a respective hub connection flange not being in the 6 o'clock position. In case one or both hub connection flanges are already occupied by a blade connector portion, the fastening means connecting the blade connector portion to the hub connection flange are temporarily removed to enable the attachment of the truss system mounting beam(s).

To prepare the blade to be lifted/raised, a blade pulley system 157 including at least one pulley is attached to the blade connector portion of a blade 112. Furthermore, a hoisting device 124 for raising/lifting (or lowering in case a blade has to be removed) the blade or from the hub is provided. The hoisting device may be provided within the hub, the nacelle or the tower. Alternatively, the hoisting device may be provided outside the turbine, for example on a truck, as it is shown in FIG. 2. A person skilled in the art will understand that is not essential that the method steps mentioned above are performed in the given order.

To be able to raise/lift (or lower) the blade with the hoisting device a cable connection 126 between the hoisting device 124 and the blade pulley system 157 (via the truss system (135) must be provided. Depending on configuration of the pulley system provided by the truss system and the blade pulley beam, such cable connection starts at the truss system 135 or the blade pulley beam. In the embodiment shown in FIGS. 3a and 3b, the cable connection starts at 148c (FIG. 4).

After a cable connection 126 has been established, the blade 112 may be raised. Before raising the blade 112 the load path of said blade 112 may be determined and the truss system 135 may be attached so that the at least one pulley 148a, 148b is in a predetermined position in respect of the load path. Furthermore, the pulley of the blade pulley system 157 may be arranged in accordance with the load path. A person skilled in the art will understand how the load path of a blade can be determined and to not obscure the invention as such, the progress of determining the load path is not described in detail.

As soon as the hub connection flange and the blade connector portion are brought together, the blade connector portion of said blade 112 is attached to the hub connection flange 131 by, for example, bolting the hub connection flange to the blade connector portion. After the hub connection flange and the blade connector portion have been connected, the blade pulley system 157 and the truss system 135 are removed leaving no additional weight within the hub or the nacelle. Furthermore, no additional openings for attaching the truss system or the blade pulley system have been created within the hub or the blade.

To facilitate the alignment of the hub connection flange and the blade connector portion when it approaches the hub connection flange, a plurality of flexible cables 200, each being connected to a hoist 210, are attached to the blade connector portion of the blade 112 when the blade connector portion approaches the hub connection flange 131. Before attaching the blade connector portion to the hub connection flange 131, any misalignment between the hub connection flange 131 and the blade connector portion is adjusted by using said hoists 210. In FIGS. 3a and 3b, only one hoist is shown, and the hoist 210 in accordance with the shown embodiment is attached to the hub connection flange 164.

The T-bolt capacity is set forth in the following table.

Blade T-Bolt Capacity Table

T-bolt Tensile Yield Strength: 580 kN
T-bolt Shear Yield Strength=0.58 $\tau_{ys}$: 336.4 kN
Blade Weight (avg. C-96): 12500 kg=122.6 kN
Using 4 pick points on the pitch bearing:
* This is assuming that the weight is distributed equally among all 4 points.
** Neglecting the additional support provided by the clamping mechanism.
*** Assuming static loading, no dynamics taken into account.
T-Bolts in Pure Tension:
122.6 kN/4=30.65 kN per stud
580 kN/30.65 kN=18.9
F.S. Against Yielding in Tension=18.9
T-Bolts in Pure Shear:
122.6 kN/4=30.65 kN per stud
336.4 kN/30.65 kN=10.97
F.S. Against Yielding in Shear=10.97

Tag Line Set-Up

Two tag lines extending from the tip of the blade may be used to control the blade decent during blade lowering.

Transition of Blade to Shipping Fixtures

Figure 7:
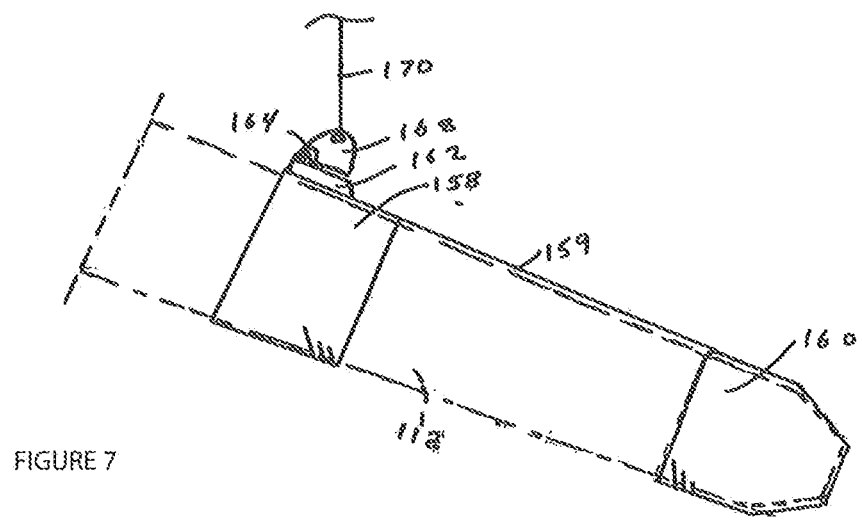
FIG. 7 is a perspective view of a tail pick strap/sock used to steady the blade while unloading or loading the blade on a transport truck.

Refer to FIG. 7, which is a perspective view of a tail pick strap/sock used to steady the blade while unloading or loading the blade on a transport truck. The tail pick is comprised of a strap 158 connected by a band 159 to a sock 160. The strap 158 fits around the girth of the blade 112 (shown in phantom) and the sock 160 fits over the blade tip. The strap 158 has a stationary base plate 162 attached to it, which has a pivot hole extension 164. A moveable pivot plate 168 is attached to the base plate 162 by means of a bolt through the pivot hole in the base plate extension 164. The pivot plate is attached to a cable wire 160, which is controlled by a crane/hoist mechanism (not shown). The base plate is provided with two spacer channels to hold the strap spread apart where the strap meets the trailing edge of the blade. This prevents damage to the blade trailing edge.

Raising a Blade from a Truck Bed

Figure 8:
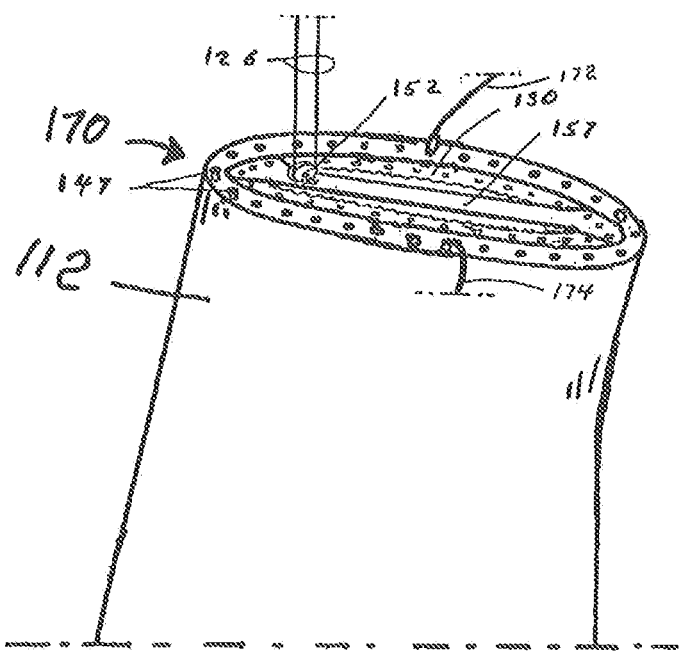
FIG. 8 is a perspective drawing of the root end of a rotor blade.

Refer to FIG. 8, which is a perspective drawing of the root end 170 of a rotor blade 112. Blades are shipped horizontally on a flatbed truck. The blade root end fixtures are either attached to the blade before shipment or installed at the wind power site prior to raising the blade for attachment to the hub. The cable 126 described with respect to FIG. 1 is wound around the pulley 152.

Means are provided for guiding the root end of the blade into alignment with a flange on the hub during disengagement and engagement of the rotor blade. A series of robust pins and cables are threaded in place of a number of pitch-bearing-to-hub bolts that are positioned appropriately to protect certain features attached to the hub.

Short (6-8 feet) flexible cables, 172, 174, are swaged onto the connection bolts of the blade. The flexible cables are long enough to engage with small winch motors attached to pitch bearing bolts inside the hub. The cable 126 hoists the blade and as the blade approaches the connection flange of the hub the connection flange slips over alignment pins 147. Any horizontal misalignment with the flange is adjusted by using the small winch motors to raise the blade by winding in one or more of the flexible cables 172, 174.

The strap/sock 158/160 is slipped over the end of the blade opposite to the root end 170. A strap cable 170 is attached to the pivot plate 168. By coordinating the wind-up of the two cables (126 and 170) the blade 112 is maintained in a horizontal position and raised vertically until it is clear of the truck. The cable 126 is pulled to raise the root end while the strap cable 170 is held steady, thus raising the blade from a horizontal to a vertical position, blade tip down. The pivoting structure of the hinge 168 relieves stress on the strap 158.

With the blade in a 170° pitch angle, the blade tip will need to swing in the tower direction for shipping fixture position. With respect to the ground crane lifting strap/sock the ground crane support position needs to be closer to the center of gravity to distribute the moment effectively between the pitch-bearing fixture and blade strap/sock.

While the specification describes a land-based installation, the invention can be utilized in offshore applications including a barge mounted hoist and guide wire fixtures as well as a lifting procedure out of the barge blade saddle or transport fixture.

The invention claimed is:

1. A wind turbine comprising:
a tower resting on a base,
at least one rotor blade having a blade connector portion,
a nacelle housing a shaft to which a hub is attached, the nacelle being mounted atop the tower,
said hub comprising a plurality of hub connection flanges, each hub connection flange being adapted to be detachably connected to a blade connector portion of a rotor blade,
a blade pulley system including at least one pulley and being detachably connected to the blade connector portion of a rotor blade, and
a truss system, said truss system comprising a pulley beam including at least one pulley and two mounting beams, each mounting beam being detachably connected to a hub connection flange, thereby positioning the pulley beam above a further hub connection flange.

2. The wind turbine of claim 1, wherein the blade connector portion of a rotor blade is provided by a pitch bearing comprising an outer race and an inner race, the outer race being adapted to be connected to a hub connection flange and the inner race being adapted to be connected to the root end of a rotor blade.

3. The wind turbine of claim 2, wherein the blade pulley system is being detachably connected to the inner race of the pitch bearing.

4. The wind turbine of claim 2, wherein a plurality of tapered alignment pins are attached to the outer race of the pitch bearing.

5. The wind turbine of claim 2, further comprising:
a plurality of flexible cables, each cable being connected to the outer race of the pitch bearing and to a hoist.

6. The wind turbine of claim 5, wherein the hoists are bolted to hub connections flanges.

7. A method for attaching a rotor blade including a blade connector portion to a hub of a wind turbine, said hub having a plurality of hub connection flanges, the method comprising steps of:
a) positioning one hub connection flange in a 6 o'clock position,
b) attaching a truss system comprising a pulley beam with at least one pulley and two mounting beams within the hub by operably connecting each mounting beam to a respective hub connection flange not being in the 6 o'clock position,
c) attaching a blade pulley system including at least one pulley to the blade connector portion of a blade,
d) providing a hoisting device,
e) providing, via the truss system, a cable connection between the hoisting device and the blade pulley system,
f) raising said blade,
g) attaching the blade connector portion of said blade to the hub connection flange; and
h) removing the blade pulley system and the truss system.

8. The method of claim 7, further comprising steps of:
determining the load path of said blade and, in step b), attaching the truss system so that the at least one pulley is in a predetermined position in respect of the load path, and
arranging the pulley of the blade pulley system in accordance with the load path.

9. The method of claim 7, further comprising the steps of:
attaching a plurality of flexible cables, each being connected to a hoist, with the blade connector portion of the blade when the blade connector portion approaches the hub connection flange, and,
before attaching the blade connector portion to the hub connection flange, adjusting any misalignment between the hub connection flange and the blade connector portion by using said hoists.

10. A kit of parts for lowering and mounting rotor blades from and to a hub of wind turbine, the kit comprising:
a blade pulley system including at least one pulley and being adapted to be operably connected to a blade connector portion of a rotor blade (112) to be lowered or mounted, and
a truss system, said truss system comprising a pulley beam including at least one pulley and two mounting beams, each mounting beam being adapted to be connected to a hub connection flange of the wind turbine hub.

11. The kit of parts of claim 10, further comprising a plurality of flexible cable/hoist assemblies, the flexible cables being adapted to be connected to the blade connector portion of a blade and the hoists being adapted to be connected to hub connection flanges.

* * * * *